United States Patent
Rantzen

(10) Patent No.: US 7,305,177 B2
(45) Date of Patent: Dec. 4, 2007

(54) APPARATUS FOR JOINING ROOF COVERING MATERIALS

(76) Inventor: Lennart Rantzen, Sodra Ringgatan 43, Alingsas (SE) SE-441 33

( * ) Notice: Subject to any disclaimer, the term of this patent is extended or adjusted under 35 U.S.C. 154(b) by 80 days.

(21) Appl. No.: 10/549,858

(22) PCT Filed: Mar. 24, 2004

(86) PCT No.: PCT/SE2004/000460
§ 371 (c)(1),
(2), (4) Date: Sep. 23, 2005

(87) PCT Pub. No.: WO2004/085759
PCT Pub. Date: Oct. 7, 2004

(65) Prior Publication Data
US 2006/0193609 A1      Aug. 31, 2006

(30) Foreign Application Priority Data
Mar. 24, 2003    (SE) .................................. 0300797

(51) Int. Cl.
*F23K 1/005* (2006.01)
(52) U.S. Cl. ...................... 392/410; 156/497
(58) Field of Classification Search ............... None
See application file for complete search history.

(56) References Cited

U.S. PATENT DOCUMENTS 4,239,581 A * 12/1980 Lang .......................... 156/497
4,737,213 A *  4/1988 Paeglis et al. ............... 156/157
4,834,828 A *  5/1989 Murphy ....................... 156/359

(Continued)

FOREIGN PATENT DOCUMENTS

DE           2 960 8593          9/1996

(Continued)

*Primary Examiner*—Thor S. Campbell
(74) *Attorney, Agent, or Firm*—Dowell & Dowell, PC

(57) ABSTRACT

An arrangement for an apparatus (1) for application of roof covering (2) and comprising a wagon (4) moveable by aid of wheels (3) intended to join together two unrolled rolls of roof covering in connection to a joint (5) on top of each other lying covering layers (6, 7) by aid of a hot air aggregate (8) supported by said wagon (4), which via a nozzle (9) blows hot gas into said joint (5) at the same time as the wagon (4) is moved forwards and at least one operating pressure roller (10) included in said wagon (4), which is intended to press together the covering layers (6, 7) lying on top of each other. The hot air aggregate (8) is turnably supported onto the one front outer portion (12) of said wagon (4) by aid of a hinge (11) having its nozzle (9) turnable inwards between those covering layers (6, 7), which shall be welded together and said operating pressure roller (10) is provided in the front, central portion (13) of the wagon (4) immediately after the nozzle (9) on the same when it is in its turned in, active position and which comprises a middle portion (14) having a smaller diameter than adjacent outer portions (15, 16) for achieving two application surfaces (17, 18) against a joint surface (19) in the joint at the same time as an extra pressure roller (20) is provided after or behind the operating pressure roller (10) intended only to act against that surface of the joint (5), which the first, operating pressure roller (10) has not treated.

4 Claims, 4 Drawing Sheets

U.S. PATENT DOCUMENTS

Figure 1:
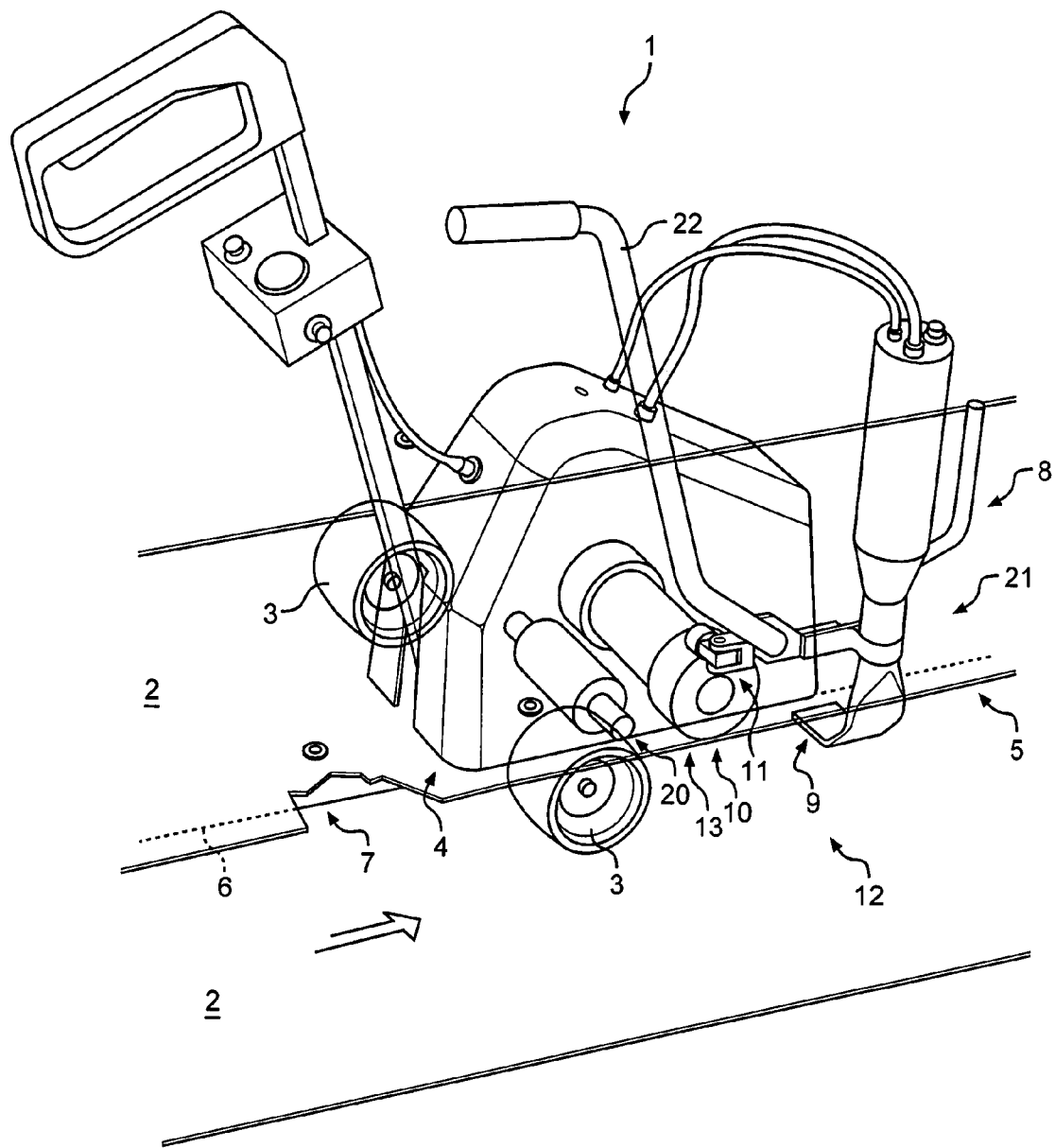

| | | | |
|---|---|---|---|
| 4,855,004 A * | 8/1989 | Chitjian | 156/359 |
| 6,149,762 A * | 11/2000 | Kobzan | 156/497 |
| 6,187,122 B1 * | 2/2001 | Hubbard et al. | 156/82 |
| 6,484,781 B2 * | 11/2002 | Weaver | 156/577 |
| 6,533,014 B1 * | 3/2003 | Rubenacker et al. | 156/497 |
| 6,536,498 B1 * | 3/2003 | Srinivasan et al. | 156/497 |
| 6,537,402 B2 * | 3/2003 | Pate et al. | 156/71 |
| 6,581,663 B2 * | 6/2003 | Rubenacker et al. | 156/391 |
| 6,610,159 B2 * | 8/2003 | Henegar | 156/82 |
| 7,043,815 B2 * | 5/2006 | Lande et al. | 29/430 |
| 2003/0019586 A1 | 1/2003 | Henegar | |

FOREIGN PATENT DOCUMENTS

| | | |
|---|---|---|
| WO | WO 0029213 | 5/2000 |

* cited by examiner

APPARATUS FOR JOINING ROOF COVERING MATERIALS

CROSS REFERENCE TO RELATED APPLICATION

This application is a National Phase of PCT Application PCT/SE2004/000460 filed Mar. 24, 2004 in the name of Lennart RANTZEN entitled, AN APPARATUS FOR JOINING ROOF COVERING MATERIALS.

The present invention refers to an improvement in an apparatus for application of roof covering for example roofing-board or roofing-cloth and which consists of a wagon which is movable by wheels and which is intended to join together two unrolled rolls of roof covering in connection to a joint having on each other lying covering layers by aid of a hot air aggregate supported by said wagon, which via a nozzle blows in hot gas into the joint at the same time as the wagon is moved forward and at least a driving pressure roller incorporated in the wagon, which is intended to press together the covering layers placed on top of each other.

Different types of devices are today used during the application of roof covering material and one example of such a device is a moveble wagon having wheels and rollers, which is intended to join together two unrolled rolls of roof covering in connection to a joint. This is performed in such a way that the respective roof covering material in the joint area is heated by hot gas, which by aid of a nozzle is blown into the joint at the same time as the wagon is moved forward and by aid of its pressing-roller presses together the covering layers laying on top of each other, said layers constitute the joint when the wagon is moved forwards, so that the melted material from the roof covering forms an adhesive. When applicating roofing-board or roofing-cloths usually a so called mechanical fastening is also made and this fastening is made in that case on top of that joint, which later on shall be overlapped by the next comming, second roll of roofing-board or roofing-cloth. The overlapped joint usually has a width of about 50-150 mm and the mechanical fastening is made in the middle of the joint surface and the distance between the fastening points is about 400-600 mm at the same time as this fastening is made in due of the underlaying under roof structure and in view of eventuel thickness of the isolation under the roofing-board or roofing-cloth. The fastening is made in such a way that all material shall be fixed to the under roof when different isolating material is used and this is also made in order to make the roof structure safe for large wind loads. After having made the mechanical fastenings the over lapped joint is melt welded together into a homogen joint by aid of an apparatus for application of roof covering and when the joint is made in a correct way a melting of the joint occurs, which has a line of melted material between those rolls, which constitute said roof covering.

During the joining of this type of overlapped joint a cylindical roller is usually pressed over the joint surface and the melted material is pressed out to a string between the different unrolled rolls, the mechanical fastening being made in the centre of the overlapped joint. This means that the surface is changed and that bulbes are arised in the intended joint surface when this type of joint is pressed together by aid of an apparatus having a driving pressure roller, which acts against the whole width of the joint, so that big problems arise in connection with the previously performed mechanical fastenings.

Another problem arising in connection with application of roof covering is that during disengaging of the operation of the apparatus in a direction forwards or another stop, one has to immediately stop the hot air aggregate in order to prevent break up melting of the roof covering material, which involves operation interuptions during the application work, which are of a very time consuming character.

The object of the present invention is now to provide a new type of apparatus for application of roof covering which for example comprises a fastenings means for the hot air aggregate, which allows the same to easily be turned outwards and upwards from its functioning, active position in preventing of a negative influence during out of drift, such as overheating of those roof covering layers, which shall be joint together at the same time as when needed the hot air aggregate in an easy way is removeble from the apparatus for eventuel manuel adjustments of the joining work performed at the same time as, thanks to the structure of the driving roll having a central portion having a smaller diameter than adjacent outer portions, during pressing of the joint is eliminating that bulbes arises in the intended joint surface, since only a low pressing exists against the mechanical fastenings, which is made, which in this case are orientated in the middle portion of the joint. Thus, two application surfaces are achieved according the present invention against the existing under layer, which operates the roller over the rough surfaces constituting the mechanical fastenings. In order to achieve a broad welding joint an extra pressure roller is also used, which only acts against the former mechanical fastenings and said pressure roller is located immediately behind the operating roll and normally works only with an movement upwards and downwards. The result of this is that this extra pressure roller only operates over that surface of the joint, which the front roll has not worked, so that a perfect welding joint between the different roof covering layers is achieved.

Figure 2:
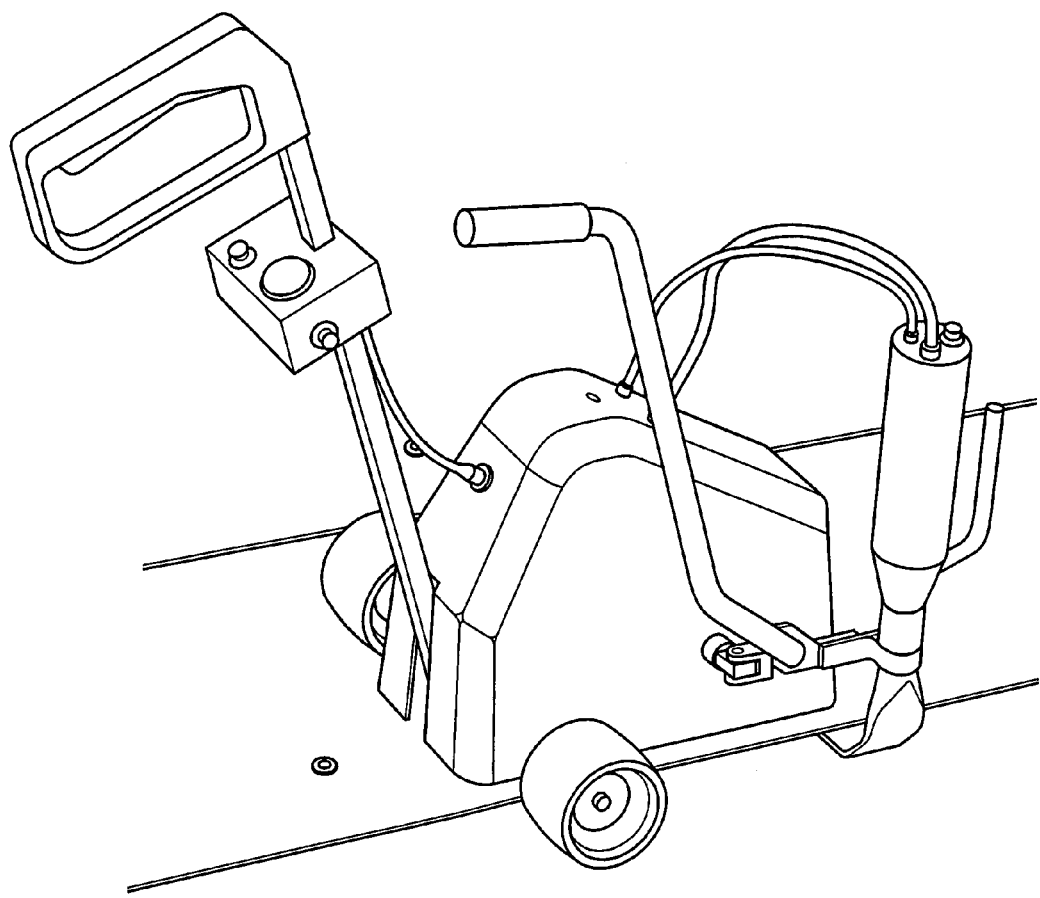
Figure 3:
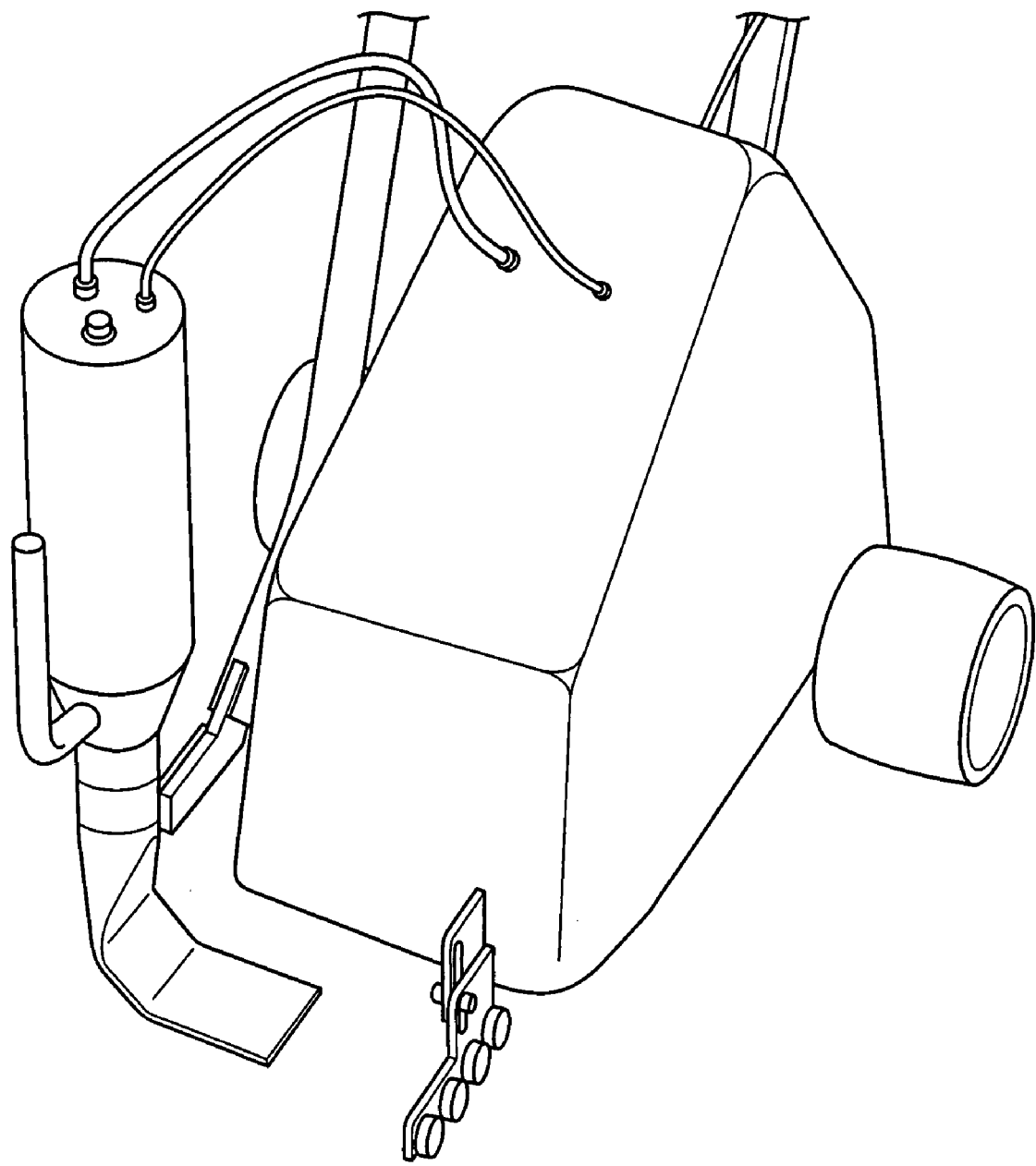
Figure 4:
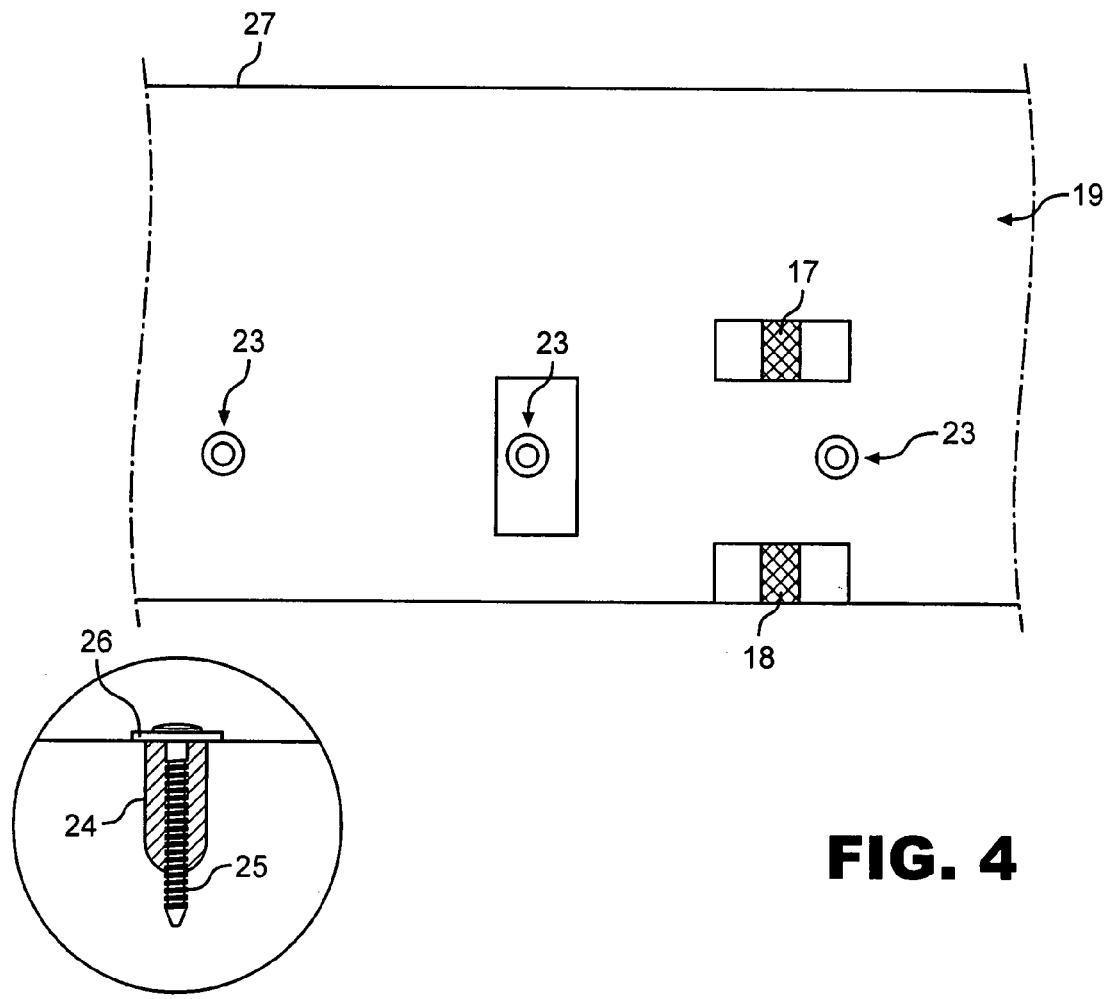
Figure 5:
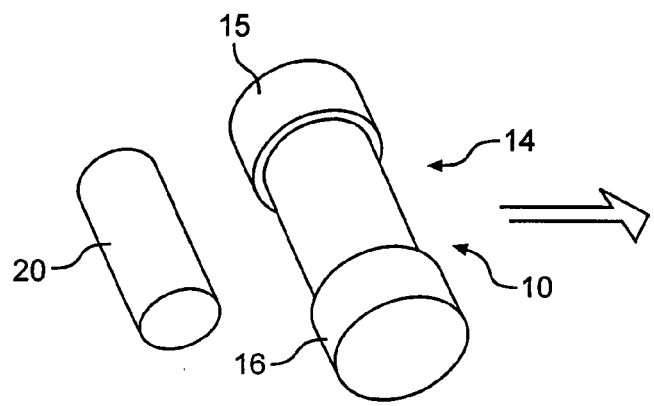

The invention is described in more detail below by means of a preferred embodiement example during reference to the drawings enclosed, in which, FIG. 1 shows a schematic exploded view in perspective of an apparatus for application of roof covering according to the present invention during application a roof covering in the form of roofing-board, FIG. 2 shows a schematic side view of the apparatus illustrated in FIG. 1 in a non transparent manner, FIG. 3 shows a front view from one side of the apparatus illustrated in FIGS. 1 and 2, FIG. 4 shows a joint between two, upon each other placed roof coverings, where mechanical fastenings are illustrated centrally provided along the joint and also a larger view of a mechanic fastening and FIG. 5 shows schematically the operating pressure roll in the apparatus together with the extra pressure roll positioned after the first roller.

As can be seen from the drawings a preferable embodiment example is illustrated of the invention in the form of an arrangement in an apparatus 1 for application of roof covering 2 for example in the form of roofing-board or roofing-cloth and which consists of a wagon 4 movable by aid of wheels 3, said wagon 4 is intended to join together two unrolled rolls of roof covering 2 in connection to a joint 5 having on top of each other lying covering layers 6,7 by aid of a hot air aggregate 8 provided in said wagon 4. Said aggregate blows hot gas by aid a nozzle 9 into the joint 5 at the same time as the wagon 4 is moved forward. The apparatus 1 further comprises an operating pressure roller 10, which is intended to press together on top of each other lying covering layers 6,7 after warming up the joint 5 at the same time as a melted out material 27 seals said joint 5.

The hot air aggregate 8 is by aid of a hinge 11 turnable sideways and supported on the one, front outer portion 12 of the wagon 4 and is together with its nozzle 9 turnable inwards between those covering layers 6 and 7 which shall be welded together. The hot air aggregate 8 is removeble mounted in a mainly vertical position in a fastening means 21 having a adjustable handle 22, which in turn is turnable and tiltable supported in the wagon 4 by aid of said hinge 11. By aid of this arrangement the hot air aggregate 8 can easily be turned away during eventuel stocking by the wagon during the application work. Further the hot air aggregate can easily be removed as mentioned above for eventual manuel works in connection to the actual application. The fastening means 21 having its mounted hot air aggregate 8 is in its turned in, active working position spring loaded fixed to the wagon by aid of a magnet lock or ball lock, so that a flexible movement is provided of the hot air aggregate during the operation of the wagon in a direction forward during the application work.

As can be seen from the drawings the operating pressure roller 10 is provided in the front, central portion 13 of the wagon 4 near and after said nozzle 9, when the same is in its active, turned in position. The operating or driving pressure roller 10 has a middle portion 14, which has a smaller diameter than the adjacent outer portions 15,16 in providing two applicating surfaces 17,18 against the actual joint surface 19 at the same time as an extra pressure roller 20 is provided after or behind the operating pressure roller 10, which is intended only by aid a regulated pressure to act against one surface of the joint, which the front operating pressure roller 10 has not treated. By this arrangement large problems can be eliminated, which in other ways can arise during an earlier performed mechanical fastening of the roofing-board or roofing-cloths.

As is closer illustraded in FIG. 4 such a mechanical fastening 23 is made in the centre of the joint surface 19 and the distance between these fastenings 23 is about 400-600 mm. In this example these mechanical fastenings 23 consist of plastic- or metal sleeves 24, which are mounted by aid of an elongated screw 25 having a covering washer 26 for fixing from above of all material on to the under roof and in this way different materials in the roof are secured for big wind loads. By the example illustrated the diameter of the cover washers 26 and screws 25 is about 40-50 mm, respectively. Since the operating pressure roller has to work with an optimal application surface against the existing underlay it is according to the example illustrated, formed with a middle portion 14, which has a smaller diameter than its adjacent outer portions 15,16. Thanks to that the outer portions 15,16 of the operating roller 10 are provided with a larger diameter than the middle portion 14 two outer application surfaces 17,18 are achieved against the existing underlay, so that the roller can move over those rough surfaces, which the mechanical fastenings 23 constitute. After having moved the operating roller 10 over said fastenings 23 along the joint surface 19 the extra pressure roller 20 acts against that surface, which the front roller 10 has not treated. This extra pressure roller is only weight loaded and has no influence on the apparatus 1 or the operating pressure roller 10. It does not influence neighter the balance of the apparatus 1 and follows only automatically that underlay against which it is treated. The extra pressure roller 20 is further not operating but works only with a movement upwards and downwards. In the structure illustrated this pressure roller 20 is loaded with about 6 kg and is telescopally fixed for its vertical movement in said apparatus.

The invention claimed is:

1. An apparatus (1) for applying roof covering (2) comprising:
    a wagon (4) having a front outer portion (12), a front central portion (13), and wheels (3) attached to said wagon, said wagon (4) being adapted to join together two unrolled rolls of roof covering in connection to a joint (5) formed by covering layers (6,7) lying on top of each other;
    a hot air aggregate (8) supported by said wagon (4), said hot air aggregate (8) adapted to blow hot air toward the joint 5 to facilitate the joining together of the two unrolled rolls of roof covering in connection to the joint (5);
    a nozzle (9) via which said hot air aggregate (8) blows hot gas toward the joint (5) at the same time as said wagon (4) is moved forward;
    at least one operating pressure roller (10) attached to said wagon (4), said at least one operating pressure roller (10) being adapted to press together the covering layers (6,7) lying on top of each other; and
    an extra pressure roller (20) located behind said at least one operating pressure roller (10), said extra pressure roller (20) being adapted to only act against a surface of the joint (5) that is not treated by said at least one operating pressure roller (10),
    wherein said hot air aggregate (8) is movably mounted to said front outer portion (12) of said wagon (4) by a hinge (11) so that said nozzle (9) can be pivoted inwardly to an active position between the covering layers (6,7),
    and wherein said at least one operating pressure roller (10) is provided in the front, central portion (13) of the wagon (4) behind said nozzle (9) when said nozzle is pivoted inwardly to the active position between the covering layers (6,7) and said at least one operating pressure roller (10) includes a middle portion (14) and adjacent outer portions (15,16), said middle portion (14) having a diameter that is smaller than diameters of said adjacent outer portions (15,16) so as to provide two application surfaces (17,18) against a joint surface (19) in the joint (5).

2. An apparatus according to claim 1, wherein said hot air aggregate (8) is mounted in a substantially vertical position in a fastening means (21) having an adjusting handle (22), which is moveably mounted to said wagon (4) by said hinge (11).

3. An apparatus according to claim 2, wherein said hot air aggregate (8) is spring loaded in said fastening means (21) by a magnet lock or ball lock and is pivoted inwardly to an active position between the covering layers (6,7).

4. An apparatus according to claim 1, wherein said extra pressure roller (20) is telescopically mounted to the apparatus (1) and is adapted to move upward and downward as said extra pressure roller acts against the joint (5) with adjustable pressure.

* * * * *